June 13, 1967 W. L. OATES 3,324,826
APPARATUS FOR METALIZING A WAFER
Filed Jan. 22, 1963 4 Sheets-Sheet 1
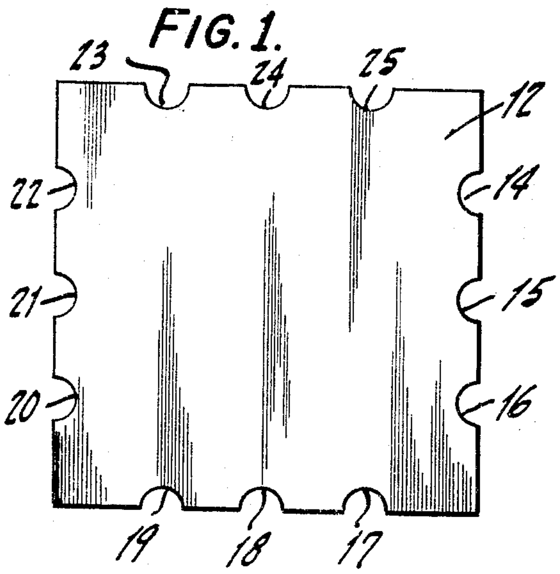
FIG. 1.
FIG. 1a.
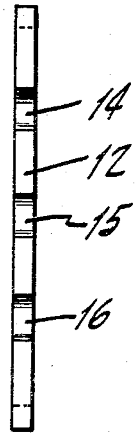
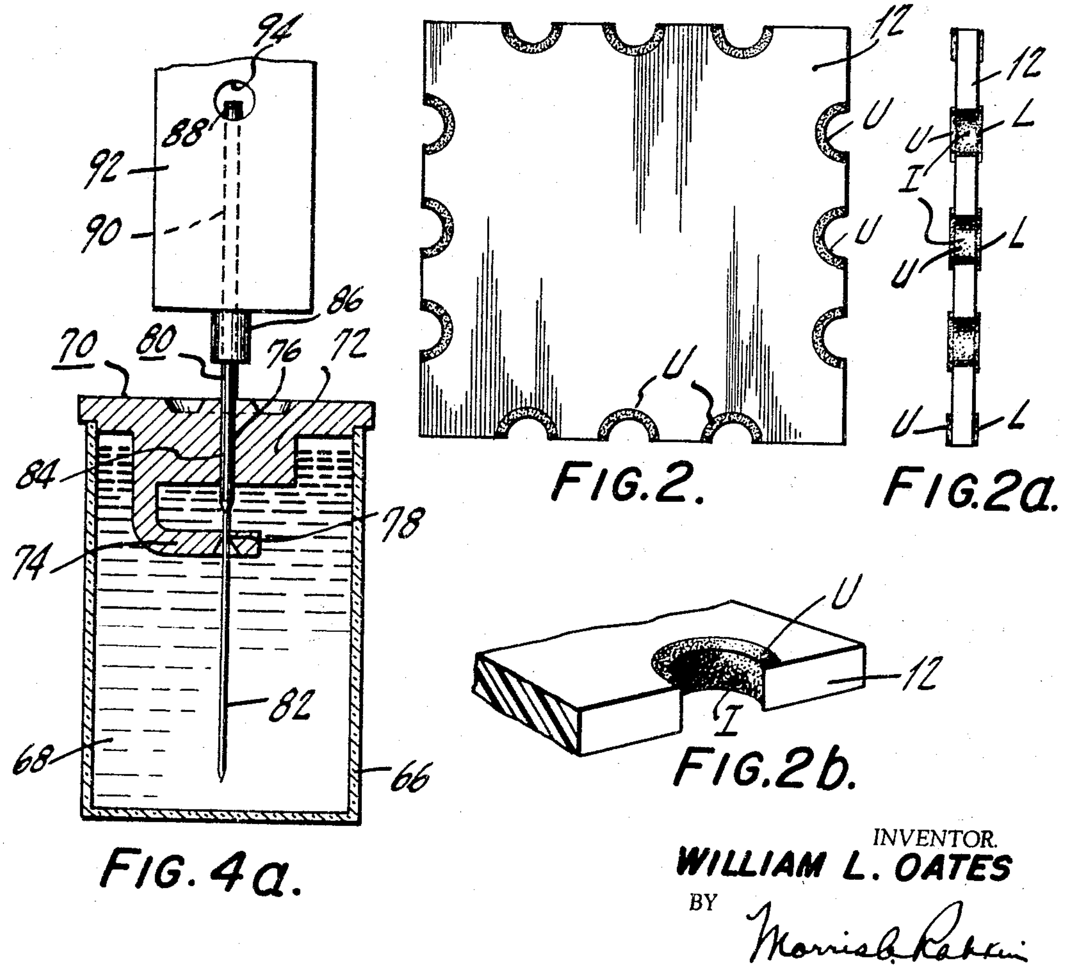
FIG. 4a. FIG. 2. FIG. 2a. FIG. 2b.
FIG. 4a.
INVENTOR.
WILLIAM L. OATES
BY Morris B. Rabkin
Attorney INVENTOR
WILLIAM L. OATES
BY Morris A. Rabkin
Attorney June 13, 1967 W. L. OATES 3,324,826

APPARATUS FOR METALIZING A WAFER

Filed Jan. 22, 1963 4 Sheets-Sheet 3

INVENTOR
WILLIAM L. OATES
BY [signature]
Attorney

INVENTOR.
WILLIAM L. OATES
BY
Morris [signature]
ATTORNEY 3,324,826
APPARATUS FOR METALLIZING A WAFER
William L. Oates, Bernardsville, N.J., assignor to Radio Corporation of America, a corporation of Delaware
Filed Jan. 22, 1963, Ser. No. 253,161
5 Claims. (Cl. 118—243)

This invention relates generally to means for applying paint to an object, and more particularly to apparatus for metalizing a portion of a ceramic wafer. The apparatus of the present invention is particularly useful for forming electrical and mechanical terminals at the notched edges of ceramic substrates employed as microelements in micromodules.

One type of micromodule in use in electronic equipment comprises a stack of wafer-like microelements interconnected by a number of straight (riser) wires that are soldered to metalized terminals at notched edges of the microelements. Each microelement has substantially the same basic peripheral outline. These microelements may be substantially square ceramic wafers, for example, each side being 0.310 inch square and formed with three equally spaced notches along each edge. In order to make an electrical or mechanical connection at a notch in the wafer, the surface at and adjacent to the notch is metalized to form a terminal. The metalizing material must be deposited in a precise pattern at each notch to form a continuous surface comprising a top surface land, a bottom surface land, and an interconnecting (notch) land. The terminals are then coated with solder to assure a good electrical connection with the riser wires when the wafers are assembled into a modular structure, such as a micromodule.

It has been proposed to form terminals at the notches of ceramic wafers by silk screen techniques, using a paint consisting of metal powder, glass frit, and a suitable liquid vehicle. The top surface lands are screened on one side of the wafer and then dried in air. Next, the bottom surface lands are screened on the wafer. After further air drying, the interconnecting (notch) lands between the top and bottom surface lands are painted on the wafer with a small brush, and the wafer is dried in air. Finally, the wafers may be fired and coated with solder.

While the silk screen method of metalizing a wafer is satisfactory for some applications, this method produces a high percentage of rejected parts because the lands are sometimes out of registration with the notches in the wafer. This is particularly true when the silk screen method is used with relatively small microelements. Also, the production costs of metalized microelements prepared by the silk screen method are relatively high.

It is an object of the present invention to provide an improved means for metalizing ceramic wafers at a relatively much lower cost and with fewer rejects than with silk screen techniques.

Another object of the present invention is to provide improved apparatus for metalizing portions of an object automatically with an application of a controlled amount of paint.

Still another object of the present invention is to provide improved apparatus for forming terminals at the notches of a wafer at a rate that is relatively much faster than possible with prior art apparatus.

A further object of the present invention is to provide improved apparatus for metalizing portions of an object to provide a product that is more uniform than has been possible with prior art methods.

Still a further object of the present invention is to provide improved means for applying paint to an object, which means are relatively simple in structure, very reliable to operation, and highly efficient in use.

Briefly, the improved apparatus for metalizing a notched wafer according to the present invention comprises means for applying metalizing paint in a controlled amount to a stepped applicator rod, and means to cause the applicator rod to apply a measured amount of the paint in the vicinity of the notch of the wafer. A container for the metalizing paint is provided with a cover comprising upper and lower portions having doctor and sizing holes, respectively, the doctor hole being larger than the sizing hole. The stepped applicator rod has upper and lower parts just large enough to be received within the doctor and sizing holes, respectively. Means are provided to move the applicator rod through the cover, into and out of the container of paint, so as to cause a controlled amount of paint to be deposited on the lower part of the applicator rod. Means are provided to hold the wafer in an appropriate position to receive the proper amount of the paint at the desired portion of the wafer. Interconnected switching and cam means may be provided to cause the applicator rod to move along a controlled path transversely to the wafer when the notched portion of the wafer is brought into engagement with the lower part of the applicator rod, thereby causing the applicator rod to apply the desired amount of paint to the wafer in the vicinity of the notch.

The novel features of the present invention, as well as additional objects and advantages thereof, will be more readily understood from the following description, when read in connection with the accompanying drawings, in which similar reference characters refer to similar parts throughout, and in which:

FIG. 1 is a plan view of a ceramic, wafer-like microelement of the type to be coated by the metalizing apparatus of the present invention;

FIG. 1*a* is a side elevational view of the microelement shown in FIG. 1;

FIG. 2 is a plan view of a microelement such as shown in FIG. 1 but formed with metalized terminals at its notches by the apparatus of the present invention;

FIG. 2*a* is a side elevational view of the metalized microelement shown in FIG. 2;

FIG. 2*b* is an enlarged, fragmentary view, in perspective, of one of the metalized notches of the microelement of FIG. 2;

Figures 3, 4, 5:
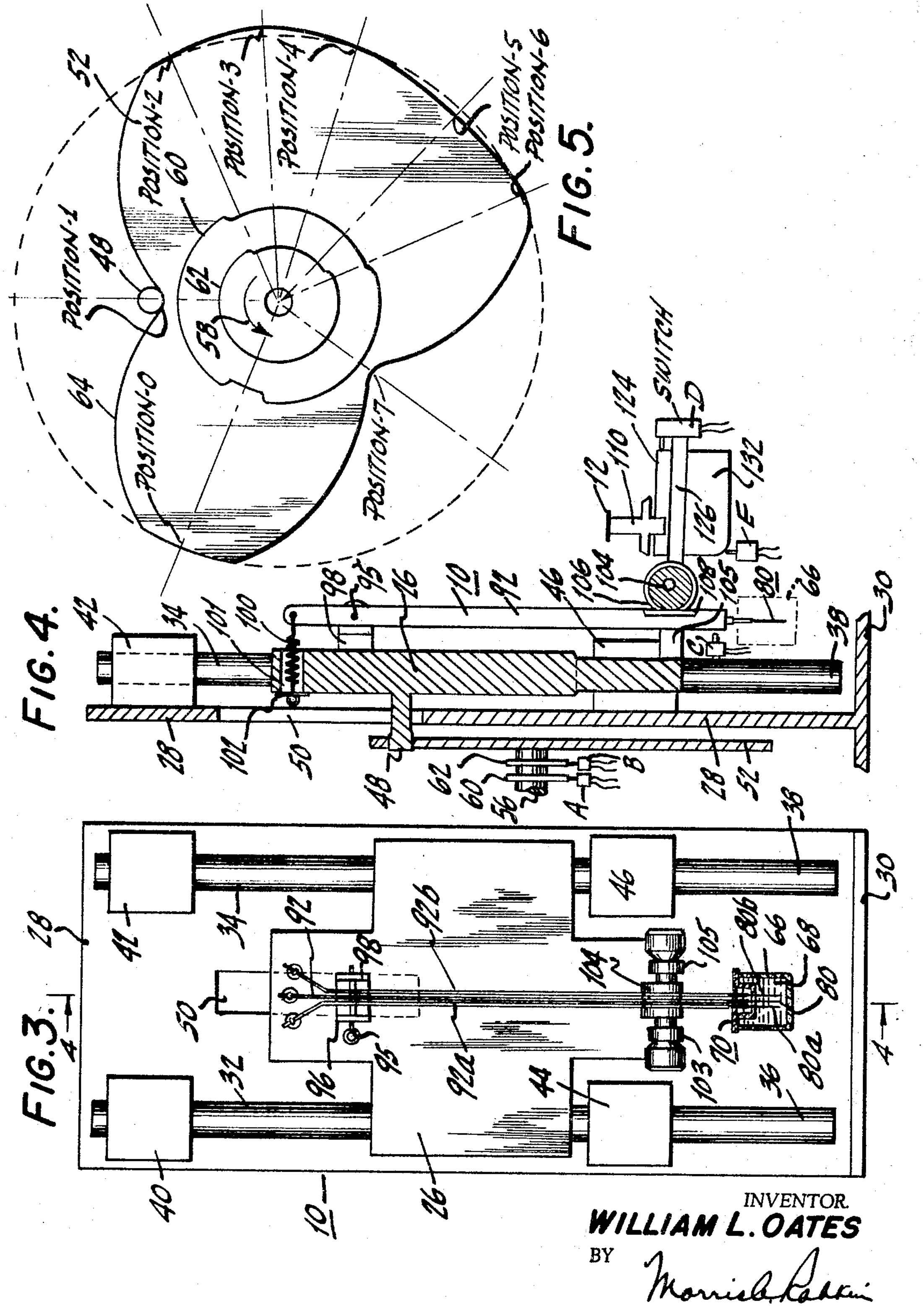
FIG. 3 is a front elevational view of apparatus of the type for applying paint to an object in accordance with the present invention.
FIG. 4 is a cross-sectional view of the apparatus shown in FIG. 3, taken along the line 4—4 in FIG. 3 and viewed in the direction indicated by the arrows.
Figure 6:
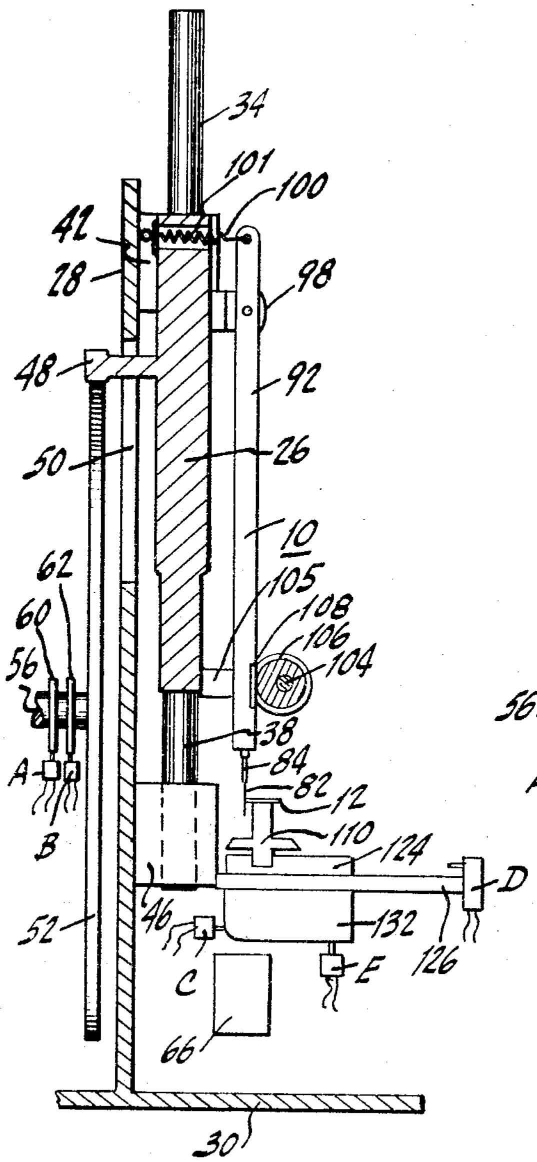
Figure 7:
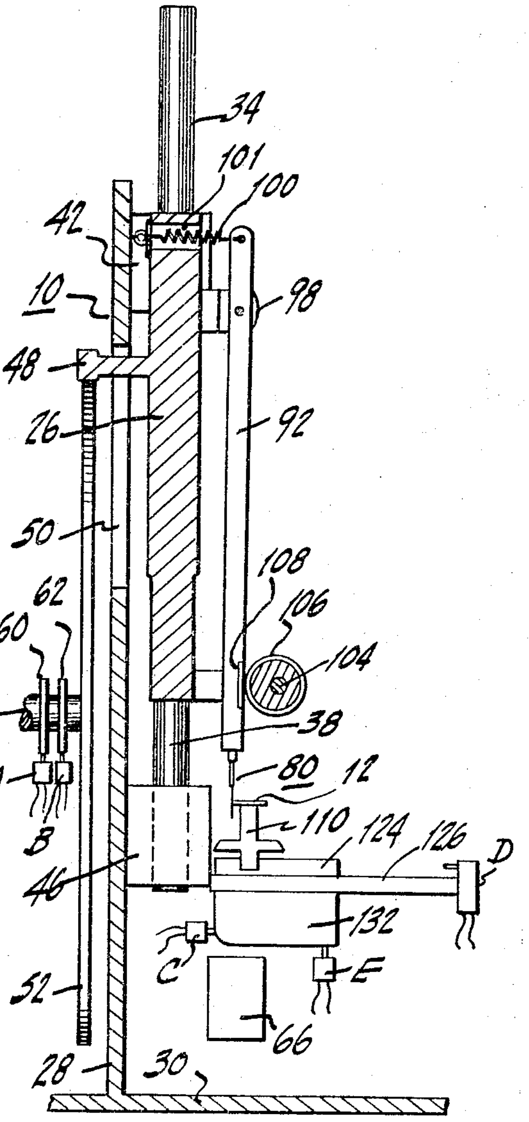
Figures 8, 9:
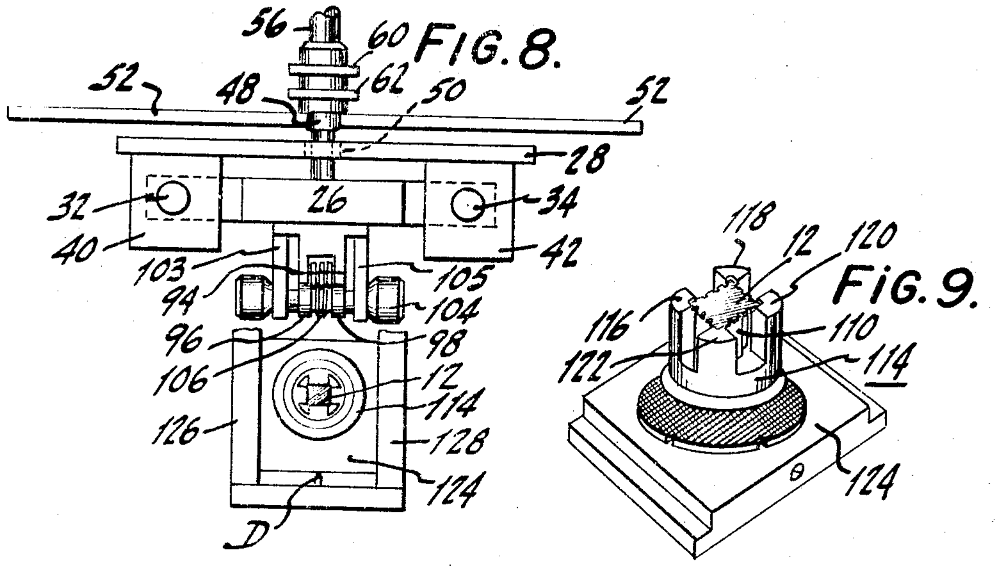
Figures 10, 11:
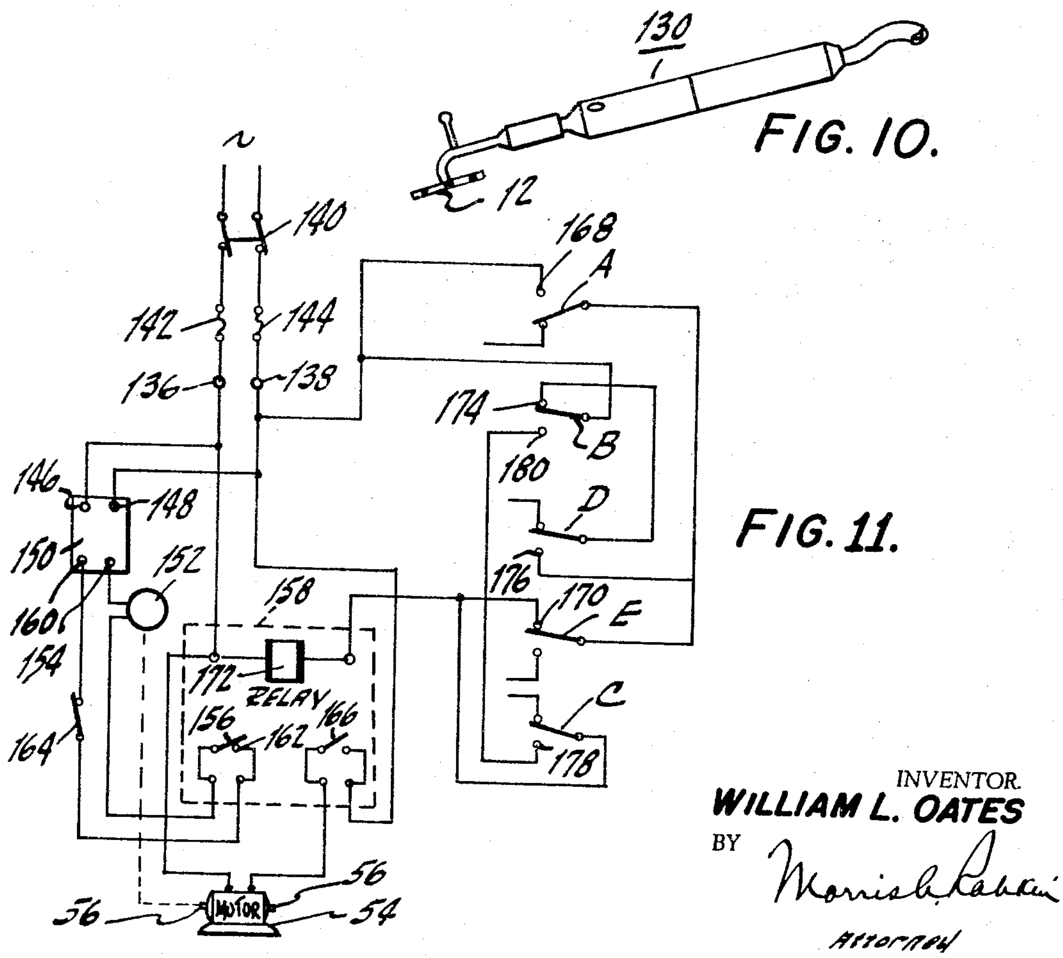

FIG. 4*a* is an enlarged, fragmentary view of the apparatus illustrated in FIG. 4, showing details of the paint container, cover, and stepped applicator rod;

FIG. 5 is an enlarged view of driving and switching cams for the apparatus shown in FIGS. 3 and 4, as viewed from the rear of the apparatus;

FIGS. 6 and 7 are side elevational views of the paint applying apparatus in various stages of operation;

FIG. 8 is a plan view of the paint applying apparatus illustrated in FIGS. 3 and 4;

FIG. 9 is a perspective view of a rotatable turret for holding and feeding microelements to the apparatus for metalizing purposes;

FIG. 10 is a perspective view of a vacuum "pencil" for handling microelements during their insertion into, and removal from, the turret; and FIG. 11 is a schematic diagram of an electrical circuit for operating the paint applying apparatus of the present invention.

Referring, now, particularly to FIGS. 3 and 4 of the drawings, there is shown paint applying apparatus 10 for applying metalizing paint to a microelement, such as a wafer 12. The wafer 12 may comprise a ceramic substrate of a substantially square configuration formed with a plurality of notches 14–25 in its periphery, as shown in FIGS. 1 and 1*a*.

The apparatus 10 comprises a carriage 26 in the form of an H-member adapted to be reciprocated in a vertical direction with respect to a fixed supporting plate 28. The plate 28 extends from, and is supported by, a horizontal base plate 30.

The carriage 26 comprises four cylindrical members 32, 34, 36 and 38 that form the legs of the H-member and that are disposed in bearings 40, 42, 44 and 46, respectively, for vertical reciprocating motion therein.

Means are provided to reciprocate the carriage 26 in a direction parallel to the plate 28. To this end, a cam follower 48 extends rearwardly from the carriage 26 through a slot 50 in the plate 28. The cam follower 48 is adapted to ride on the surface of a main cam 52 for reciprocating the carriage 26 in accordance with a pattern determined by the contour of the cam 52. A motor 54 (FIG. 11) is coupled to a shaft 56 which, in turn, is fixed to the cam 52 for turning the latter in the direction indicated by the arrow 58 (FIG. 5). A pair of cams 60 and 62 are fixed to the shaft 56 for actuating a pair of switches A and B, respectively, as the shaft 56 rotates. The cams 60 and 62 are shown in FIG. 5, in a relatively displaced, though concentric, relationship to illustrate the cooperation of these cams with the switches A and B during the operation of the apparatus 10. The carriage 26 is reciprocated in a vertical direction in accordance with the contour of the cam surface 64 of the cam 52 when the cam 52 is rotated.

A container 66, shown in cross-section in FIG. 3, for metalizing paint 68 is fixed with respect to the base 30 by any suitable, adjustable means (not shown). The paint 68 may comprise, for example, a powder of silver, gold, or platinum mixed with glass frit in a suitable liquid vehicle, such as butyl carbitol acetate, to form a liquid of creamy consistency. The container 66 is shown in a dashed outline in FIG. 4 so as not to obscure the parts within the container 66. Details of the container 66 and its associated parts are shown in FIG. 4*a* of the drawings. The container 66 is fitted with a cover 70 having an upper portion 72 and a lower portion 74 that is spaced from the upper portion 72, the lower part of the upper portion 72 and the entire lower portion 74 being adapted to be disposed within the paint 68. The upper and lower portions 72 and 74 of the cover 70 are formed with aligned doctor and sizing holes 76 and 78, respectively. The doctor and sizing holes 76 and 78 are preferably round and concentric with respect to each other, the doctor hole 76 being larger than the sizing hole 78. As will appear more clearly hereinafter, the sizing hole 78 is employed for the purpose of gauging the quantity of paint to be applied to the wafers.

A stepped, paint applicator rod 80 is preferably round in cross-section and has a lower part 82 of smaller diameter and transverse, cross-sectional area than an upper part 84. The upper and lower parts 84 and 82 of the applicator rod 80 are adapted to just fit slidably within the doctor hole 76 and the sizing hole 78, respectively. An enlarged, preferably knurled part 86 of the rod 80 is used for inserting the end part 88 of the rod 80 into a hole 90 in an arm 92. The hole 90 communicates with a transversely drilled hole 94 in the arm 92 into which the end 88 extends. The hole 90 provides access for ejecting the rod 80 when so desired.

The rod 92 is fixed to the carriage 26 to be reciprocated therewith, thereby moving the applicator rod 80 into, and out of, the container 66. The rod 92 is pivotally attached to the carriage 26 by means of a pivot pin 95 that extends through a pair of forwardly extending ears 96 and 98 on the carriage 26, and through a hole near the upper portion of the arm 92. The upper end of the arm 92 is urged toward the carriage 26 by means of a spring 100.

The spring 100 extends through a hole 101 in the carriage 26 and connects the upper end of the arm 92 to a plate 102 on the rear surface of the carriage 26.

The lower end of the arm 92 is prevented from swinging away from the carriage 26 by an eccentric cam 104 formed with a plurality of V grooves 106 in one of which the mating V section 108 of the arm 92 is received. The eccentric cam 104 is disposed between a pair of ears 103 and 105 extending forwardly from the lower portion of the carriage 26, as shown in FIG. 8. By adjusting (rotating) the eccentric cam 104, the arm 92 may be positioned so that the applicator rod 80 is aligned to enter the doctor and sizing holes 76 and 78 in the cover 70 when the carriage 26 is reciprocated.

When it is desired to apply paint to more than one place of an object simultaneously, a plurality of arms and paint applicator rods, similar to the arm 92 and the rod 80, respectively, may be fixed to the carriage 26. Thus, arms **92*a* and 92*b*, on opposite sides of the arm 92, are pivotally connected to the carriage 26 in the same manner as described for the arm 92. Paint applicator rods 80*a* and 80*b* are press fitted into holes in the lower ends of the rods 92*a* and 92*b*, respectively, and each extends through a separate pair of doctor and sizing holes in the cover 70 in the same manner as explained for the applicator rod 80. Corresponding parts of the additional arms 92*a* and 92*b* and applicator rods 80*a* and 80*b* are designated herein by the same reference numbers as used for the arm 92 and rod 80**, respectively, and an additional reference letter that corresponds to that of the additional arm or rod.

When the notches of the wafer 12 are to be metalized, the wafer 12 is placed on an anvil 110 of a turret 114, as shown in FIG. 9. The turret 114 has four upwardly extending arms 116, 118, 120, and 122 formed with suitable nesting recesses in their upper surfaces for supporting the wafer 12 in a relatively fixed position. The turret 114 may be rotated into four detented positions 90 degrees from each other. Detent means (not shown) are within a slide 124 on which the turret rotates for releasably holding the turret in any one of the positions to which it may be moved. The slide 124 is adapted to fit slidably between parallel, grooved rails 126 and 128 to carry the wafer 12 into engagement with the lower parts 82, **82*a* and 82*b* of the applicator rods 80, 80*a* and 80*b* for applying paint adjacent to the three notches along one edge of the wafer 12. A vacuum pencil 130 (FIG. 10) may be used to handle wafers 12 for their insertion into, and removal from, the turret 114**.

The turret 114 is not shown in its entirety in FIGS. 6 and 7, only the anvil 110 being shown therein, to illustrate more clearly the operation of the apparatus 10.

A plurality of switches, interconnected as shown in FIG. 11, are provided to operate the apparatus 10 in a safe and efficient manner. A switch D is fixedly disposed between the rails 126 and 128 and, when actuated by the slide 124, causes the carriage 26 to move downwardly so that the applicator rods 80, **80*a* and 80*b* are coated with paint at the start of the painting operation. A switch C is fixed so as to be contacted by the slide 124 in its forward position to provide a wiping motion of the applicator rod 80 against the wafer 12** for applying a predetermined quantity of paint to the latter.

Referring, now, to FIG. 11 the switches A, B, C, D, and E are shown interconnected in an electrical circuit for operating the apparatus 10. Each of the switches A, B, C, D, and E is of the single-pole, double-throw type and is spring loaded so that its movable arm is normally in contact with one of its two fixed contacts, as shown in FIG. 11, when not actuated by external means. A source of suitable A-C voltage is applied to a pair of input terminals 136 and 138 through a double-pole, single-throw switch 140 and a pair of fuses 142 and 144. The input terminals 136 and 138 are connected to a pair of input terminals 146 and 148 of a rectifier 150 for a magnetic brake 152. An output terminal 154 of the rectifier 150 is connected to the arm of a normally closed switch 156 in a relay 158 through the brake 152. Another output terminal 160 of the rectifier 150 is connected to the fixed contact 162 of the switch 156 through a normally closed switch 164, the latter switch being used for servicing the equipment.

The magnetic brake 152 is mechanically coupled to the shaft 56 of the motor 54 to stop the latter when the switch 156 is closed. The input terminal 136 is connected directly to one input terminal of the motor 54, and the terminal 138 is connected to another input terminal of the motor when a normally open switch 166 is closed. The input terminal 138 is connected to a fixed contact 168 of the normally open switch A, the arm of the switch A being connected to the arm of the normally closed switch E. A fixed contact 170 of the switch E is connected to the input terminal 136 through an actuating winding 172 of the relay 158. The input terminal 138 is also connected to the arm of the switch B, the latter arm being normally in contact with a fixed contact 174 which, in turn, is connected to the arm of the normally open switch D. A fixed contact 176 of the switch D is connected to the arms of the switches A and E. The fixed contact 170 of the switch E is connected to the movable arm of the normally open switch C, and the fixed contact 178 of the switch C is connected to a contact 180 of the switch B. Current through the winding 172 of the relay 158 causes the switch 156 to open and the switch 166 to close, thereby releasing the brake 152 from the motor 54 and causing the latter to turn.

The operation of the apparatus 10 will now be explained. The operator of the apparatus 10 places a wafer 12 within the nesting corners of the arms of the turret 114 with the aid of the vacuum pencil 130. The carriage 26 is initially in a raised position, as determined by the position 0 of the main cam 52 (FIG. 5). Initially, the slide 124 is remote from the carriage 26, as shown in FIG. 4, and the applicator rods 80, 80*a*, and 80*b* are raised, as shown in FIG. 6. Before the apparatus 10 is put into operation, the switches A, B, C, D and E are in the positions shown in FIG. 11.

To begin the first dipping operation, the operator pulls the slide 124 back to close the normally open switch D momentarily. This action actuates the relay 158 which, in turn, opens the switch 156 to release the brake 152 and closes the switch 166 to start the motor 54. As soon as the motor 54 is energized, the cam 60 actuates (closes) the switch A so that its arm makes contact with the fixed contact 168 and maintains the motor circuit energized when the switch D is now released (opened). The cam assembly 52, 60, 62 now complete about one-third of a revolution, at which point, the cam 60 opens the switch A to cause the motor 54 and, therefore, the cam assembly to stop. During this one-third revolution, the carriage 26 is lowered and the paint applicator rods 80, 80*a* and 80*b* are dipped into the paint container 66 to be coated with paint 68, as determined by position 1 of the cam 52. The carriage 26 is then raised and stopped automatically by the cam 52 at position 2 because the cam 60 actuates (opens) the switch A again in this position. Just before the carriage 26 stops, the cam 62 actuates the switch B to open it, thereby preventing any accidental contact with the switch D from causing the apparatus 10 to operate. During the dipping operation of the applicator rods 80, 80*a* and 80*b*, the turret slide 124 must remain remote from the applicator rods. Should the operator attempt to move the slide 124 forward during the dipping operation, the safety switch E would be actuated by a downward extension 132 on the slide 124 to open the circuit of the relay winding 172 and thus effect stopping of the motor 54 automatically by disconnecting the electrical supply to the motor and by causing the brake 152 to be applied to the motor shaft 56.

To apply paint adjacent to the three notches along the edge of the wafer 12, facing the applicator rods 80, 80*a* and 80*b* (that is, to apply upper, lower, and interconnecting lands at the notches along that edge of the wafer), the operator pushes the turret slide 124 all the way forward while holding the wafer 12 down on the anvil 110 by means of the vacuum pencil 130. The slide extension 132 engages and actuates the switch C to close the latter. The operator holds the slide 124 there until the carriage 26 stops moving. During the paint application operation, each of the lower parts 82, 82*a* and 82*b* of the rods 80, 80*a* and 80*b*, respectively, is engaged within the separate notch along the advance edge of the wafer 12. The switch C starts the motor 54 and rotates the main cam 52 from position 2 (starting position) through position 3 (where the applicator rods 80, 80*a* and 80*b* are raised about one-eighth of an inch to apply a lower lands on the wafer 12), through position 4 (where the rods are returned to the starting position), through position 5 (where the rods are lowered about one-eighth inch to apply upper lands to the wafer 12) and to a position 6 (where the rods are returned to the starting position). The carriage 26 then stops automatically by the action of the cam 62 and the switch B. During this paint application cycle, the applicator rods 80, 80*a* and 80*b* are pushed back from their V grooves 106 on the eccentric cam 104, as shown in FIG. 7, and are free to move sideways to overcome extreme tolerances in the spacing of the notches. Thus, positive contact with an applicator rod at each notch of the wafer 12 is assured.

After the paint application operation, any surplus paint 68 on the lower parts 82, 82*a* and 82*b* of the respective applicator rods 80, 80*a* and 80*b* is completely removed by the lower cover portions 74 that define the respective sizing holes 78. The paint 68 thus removed is returned to the container 66. This action prevents stale paint from congealing on the applicator rods, thereby providing a controlled quantity of paint to be transferred to the wafer 12. Also, paint 68 can not congeal about the doctor holes 84 because the lower surface of the upper cover portion 72 is disposed below the normal paint level in the container 66. It is usually not necessary to stir the paint 68 because the latter is usually of a high viscosity and, except for the relatively small openings of the doctor holes 76, is not exposed to the ambient air. It is noted that the doctor holes 76 and the sizing holes 78 are self-cleaning by the remaining action of the upper and lower parts 82 and 84 of the respective applicator rods 80, 80*a* and 80*b*.

The operator starts a second dipping operation by pulling the slide 124 back to make momentary contact with the switch D to start the motor 54. The second dipping operation is preferred, but need not be provided. The cam 52 may be cut to start a cycle again. However, a more uniform result is obtained with the second dipping operation. The cam 60 actuates the switch A again and assures that the machine will continue through position 7 to position 0. The safety switch E again prevents accidental damage due to movement of the slide 124 into the moving arm zone by causing the motor 54 to stop if the slide 124 is pushed forward during the second dipping operation.

After completion of the second dipping operation, the operator pushes the slide 124 forward so that the wafer 12 makes a single static contact with the lower parts of the freshly dipped applicator rods. This action assures that the paint 68 in the notches of the wafer 12 is restored to a desired thickness to overcome any thinning tendency induced by the movement of the applicator rods 80, 80*a* and 80*b* during the land depositing operation.

The operator now pulls the slide 124 all the way back to make monetary contact with the switch D and the cam cycle is started again with the repetition of the first dipping operation, as explained above. However, during the next dipping operation, the operator rotates the turret 90 degrees to metalize the notches on an adjoining edge of the wafer 12.

The above operations are repeated until the notches in all four edges of the wafer 12 have been painted. The operator then removes the completed wafer 12 from the turret 114 with the vacuum pencil 130 and places another wafer 12 in its place. The completed wafer 12 will then be substantially as shown in FIGS. 2, 2*a* and 2*b*. The surface of the wafer 12 adjacent to each notch will now comprise a continuous coating of paint of an upper land U, a lower land L, and an intermediate land I. The metalized wafer 12 is now air dried, fired in a tunnel kiln, and the lands, that is, the terminals, are coated with solder.

The application of paint 68, by means of the apparatus 10, to a wafer 12 to provide terminals results in a finished product of high quality and relatively low cost. The paint 68, however, may be applied along any notch of the wafer 12 by hand operations with the aid of the applicator rod 80, the container 66, and its cover 70. By dipping the applicator rod into the paint 68 through the cover 70, a uniform quantity of paint 68 adheres to the lower part 82 of the applicator rod when the latter is withdrawn from the container 66. By producing relative motion between the lower part 82 of the rod 80 and the wafer 12, at the site of the notches, a desired amount of paint 68 is deposited on the wafer 12 so as to provide a continuous surface comprising top, bottom, and interconnecting lands. When the lands are dried, as by air, the wafer 12 may be fired in a tunnel kiln and the lands coated with solder to provide a microelement of the type suitable for use in a micromodule structure.

From the foregoing description, it will be apparent that there have been provided improved apparatus for applying a metalizing paint to an object. While only one embodiment of the invention has been illustrated and described, and while portions of the invention have been shown in diagrammatic form, various components useful therein, as well as variations in the structure and circuitry coming within the spirit of this invention as set forth in the claims, will, no doubt, readily suggest themselves to those skilled in the art. Hence, it is desired that the foregoing shall be considered as illustrative and not in a limiting sense.

What is claimed is:

1. Apparatus for applying paint to a portion of an object, said apparatus comprising (a) a container for said paint,
(b) a cover for said container comprising an upper portion and a lower portion spaced from said upper portion and adapted to be disposed in said paint, said upper and lower portions having aligned upper and lower holes, respectively, said upper hole being larger than said lower hole,
(c) a rod having an upper part of larger cross-sectional area than its lower part, said upper and lower holes being just large enough to respectively receive said upper and lower parts therein,
(d) means to cause said rod to move into and out of said container through said holes from above said cover, and
(e) means to hold said object with said object portion against said lower part of said rod while said lower part is above said cover, whereby to apply said paint to said object.

2. Apparatus for applying paint to a portion of an object, said apparatus comprising (a) a container for said paint,
(b) a cover for said container comprising an upper portion and a lower portion spaced from said upper portion and adapted to be disposed in said paint, said upper and lower portions being formed with aligned upper and lower holes, respectively, said upper hole being larger than said lower hole,
(c) a stepped applicator rod having an upper part of larger cross-sectional area than its lower part, said upper and lower holes being just large enough to respectively receive said upper and lower parts therein,
(d) means to lower and raise said rod through said holes, from above said cover,
(e) means to hold said object with said portion thereof against said lower part of said rod while said lower part is above said cover, and
(f) means to reciprocate said rod after it is raised from said container, whereby to coat said object with said paint in the vicinity of its said portion.

3. A machine for applying a metallizing paint in the vicinity of a notch of a wafer, said machine comprising (a) a container for said paint,
(b) a cover for said container having upper and lower portions formed with doctor and sizing holes, respectively,
(c) a stepped rod having upper and lower parts adapted to be dipped into said paint through said doctor and sizing holes, respectively, whereby to retain a quantity of said paint adhering to said lower part when removed from said container,
(d) means to (1) lower said rod into said paint, (2) raise said rod to a first predetermined position out of said paint, (3) raise said rod to a second predetermined position, (4) lower said rod to a third predetermined position below said first predetermined position, and (5) raise said rod to said first predetermined position, and
(e) means to hold said wafer with said notch about said lower part of said rod during the latter's movement from its first said predetermined position to its said second and third, and back to its first said predetermined positions, respectively, whereby paint from said lower part of said rod can be applied to said wafer in the vicinity of said notch.

4. Apparatus for applying paint to an object, said apparatus comprising (a) a movable member
(b) means supporting said member for vertical reciprocation,
(c) a cam follower fixed to said member,
(d) a cam engaging said cam follower and adapted to reciprocate said member in a predetermined manner when said cam is rotated,
(e) a container for said paint fixed with respect to said member,
(f) a cover formed with a doctor hole for said container,
(g) a stepped rod having upper and lower parts adapted to be dipped into said paint through said cover, said upper part being of larger cross-sectional area than said lower part and just fitting through said doctor hole,
(h) an arm pivotally mounted adjacent to one of its two ends to said member,
(i) said rod being fixed to the other end of said arm, said container being disposed to receive said rod periodically through said cover when said cam is rotated, said arm being disposed resiliently in a substantially vertical plane and spaced from said member,
(j) means for adjusting the position of said arm so that said larger part of said rod is in registry with said doctor hole,
(k) driving means to rotate said cam, and
(l) means to push said object against the lower part of said rod when said rod is removed from said container, whereby said paint may be wiped onto said object.

5. Apparatus for applying paint to a predetermined portion of an object, said apparatus comprising (a) a movable member
(b) fixed means supporting said member for vertical reciprocation, (c) a cam follower fixed to said member, (d) a cam engaging said cam follower and adapted to reciprocate said member in a predetermined manner when said cam is rotated, (e) a container for said paint fixed with respect to said member, (f) a rod adapted to be dipped into said paint, (g) an arm pivoted adjacent to one of its ends to said member and adapted to swing in a substantially vertical plane, (h) said rod being removably fixed to the other end of said arm, said container being disposed to receive said rod periodically when said cam is rotated, (i) said arm being spring loaded to urge said other end thereof away from said member, (j) eccentric cam means supported by said member and having a grooved portion engaging said arm adjacent to said other end thereof to position said arm accurately, (k) driving means to rotate said cam, and (l) means to push said object against the side of said spring-loaded rod and out of the groove at said grooved portion when said rod is removed from said container, whereby said rod may be shifted to a position at which said paint may be wiped onto said predetermined portion of said object.

References Cited

UNITED STATES PATENTS

| | | | |
|---|---|---|---|
| 1,470,850 | 10/1923 | Largy | 118—243 X |
| 1,838,118 | 12/1931 | Smith | 118—243 |
| 2,902,002 | 9/1959 | Argyle | 118—243 |
| 2,935,961 | 5/1960 | Bins | 118—3 |
| 3,010,427 | 11/1961 | Hautau | 118—243 |
| 3,035,938 | 5/1962 | Schwinger | 118—263 X |
| 3,046,849 | 7/1962 | Bowman | 118—243 X |
| 3,172,781 | 3/1965 | Grill | 118—211 |

FOREIGN PATENTS

| | | |
|---|---|---|
| 22,603 | 11/1917 | Denmark. |

CHARLES A. WILLMUTH, *Primary Examiner.*

RICHARD D. NEVIUS, *Examiner.*

J. A. HAUG, L. G. MACHLIN, *Assistant Examiners.*